US012577175B2

(12) United States Patent (10) Patent No.: US 12,577,175 B2
Uno et al. (45) Date of Patent: Mar. 17, 2026

(54) METHOD FOR MANUFACTURING PILLAR-SHAPED HONEYCOMB FIRED BODY

(71) Applicant: NGK INSULATORS, LTD., Nagoya-City (JP)

(72) Inventors: Shota Uno, Nagoya-City (JP); Yasunori Yamazaki, Nagoya-City (JP); Yusuke Hayakawa, Nagoya-City (JP)

(73) Assignee: NGK INSULATORS, LTD., Nagoya (JP)

( * ) Notice: Subject to any disclaimer, the term of this patent is extended or adjusted under 35 U.S.C. 154(b) by 1074 days.

(21) Appl. No.: 17/650,395

(22) Filed: Feb. 9, 2022

(65) Prior Publication Data

US 2022/0306546 A1 Sep. 29, 2022

(30) Foreign Application Priority Data

Mar. 26, 2021 (JP) ................................. 2021-054152

(51) Int. Cl.
*C04B 38/00* (2006.01)
*C04B 35/00* (2006.01)
(Continued)

(52) U.S. Cl.
CPC ...... *C04B 38/0009* (2013.01); *C04B 41/4592* (2013.01); *B01D 46/2418* (2013.01);
(Continued)

(58) Field of Classification Search
CPC .................... C04B 2235/9615; C04B 2235/94
See application file for complete search history.

(56) References Cited

U.S. PATENT DOCUMENTS 4,008,033 A * 2/1977 Folmar ................... B28B 3/269
428/116
4,213,710 A * 7/1980 Hold ....................... B29C 48/62
425/207
(Continued)

FOREIGN PATENT DOCUMENTS

CN 105601290 A 5/2016
CN 106029226 A 10/2016
(Continued)

OTHER PUBLICATIONS

Chinese Office Action (Application No. 202210078497.3) dated Feb. 12, 2023.
(Continued)

*Primary Examiner* — Alison L Hindenlang
*Assistant Examiner* — Andres E. Behrens, Jr.
(74) *Attorney, Agent, or Firm* — BURR PATENT LAW, PLLC

(57) ABSTRACT

A method for manufacturing a pillar-shaped honeycomb fired body including: measuring a firing shrinkage at an end surface of a first pillar-shaped honeycomb firing body at every predetermined angle for one round based on a portion that has been located at the center of a die when a green body passes through the die, obtaining a second pillar-shaped honeycomb formed body having a corrected end surface contour by modifying an annular mask used for extrusion molding based on a result of the measuring, and then obtaining a second pillar-shaped honeycomb fired body by performing drying and firing.

6 Claims, 8 Drawing Sheets

(51) Int. Cl.

| | |
|---|---|
| *C04B 35/64* | (2006.01) |
| *C04B 41/00* | (2006.01) |
| *C04B 41/45* | (2006.01) |
| *B01D 46/24* | (2006.01) |
| *B01J 35/56* | (2024.01) |
| *B28B 3/26* | (2006.01) |
| *B28B 11/24* | (2006.01) |
| *B28B 17/00* | (2006.01) |
| *C04B 35/01* | (2006.01) |
| *C04B 35/195* | (2006.01) |
| *C04B 35/622* | (2006.01) |
| *C04B 35/638* | (2006.01) |
| *C04B 38/06* | (2006.01) |
| *C04B 111/00* | (2006.01) |
| *F01N 3/022* | (2006.01) |
| *F01N 3/28* | (2006.01) |

(52) U.S. Cl.

CPC ............... *B01J 35/56* (2024.01); *B28B 3/269* (2013.01); *B28B 11/243* (2013.01); *B28B 17/0072* (2013.01); *C04B 35/00* (2013.01); *C04B 35/01* (2013.01); *C04B 35/195* (2013.01); *C04B 35/622* (2013.01); *C04B 35/638* (2013.01); *C04B 35/64* (2013.01); *C04B 38/00* (2013.01); *C04B 38/06* (2013.01); *C04B 38/0645* (2013.01); *C04B 38/067* (2013.01); *C04B 38/068* (2013.01); *C04B 41/00* (2013.01); *C04B 2111/00793* (2013.01); *C04B 2235/3222* (2013.01); *C04B 2235/3234* (2013.01); *C04B 2235/3244* (2013.01); *C04B 2235/3427* (2013.01); *C04B 2235/349* (2013.01); *C04B 2235/3826* (2013.01); *C04B 2235/3873* (2013.01); *C04B 2235/6021* (2013.01); *C04B 2235/606* (2013.01); *C04B 2235/6567* (2013.01); *C04B 2235/94* (2013.01); *C04B 2235/9615* (2013.01); *F01N 3/0222* (2013.01); *F01N 3/2828* (2013.01)

(56) References Cited

U.S. PATENT DOCUMENTS

| | | | | |
|---|---|---|---|---|
| 4,723,847 A | * | 2/1988 | Dray | B29C 48/25682 |
| | | | | 425/207 |
| 4,834,640 A | * | 5/1989 | Inoue | B28B 3/26 |
| | | | | 425/464 |
| 4,882,104 A | * | 11/1989 | Dobrowsky | B29C 48/865 |
| | | | | 702/170 |
| 5,303,141 A | * | 4/1994 | Batchelder | B33Y 70/10 |
| | | | | 156/244.11 |
| 6,007,759 A | * | 12/1999 | Ten Tije | B29C 45/14065 |
| | | | | 264/480 |
| 6,299,958 B1 | * | 10/2001 | St. Julien | C03B 23/0066 |
| | | | | 428/116 |
| 6,680,101 B1 | * | 1/2004 | Kato | B29C 48/11 |
| | | | | 428/116 |
| 7,396,223 B2 | * | 7/2008 | Ogawa | B29C 48/11 |
| | | | | 425/467 |
| 2004/0239011 A1 | * | 12/2004 | Ishihara | F01N 3/0222 |
| | | | | 264/630 |
| 2006/0198984 A1 | * | 9/2006 | Aoki | B01D 53/9454 |
| | | | | 428/116 |
| 2007/0199205 A1 | * | 8/2007 | Hoshino | C04B 35/565 |
| | | | | 34/437 |
| 2012/0217669 A1 | * | 8/2012 | Balster | F27B 9/028 |
| | | | | 264/40.6 |
| 2013/0300016 A1 | | 11/2013 | Brew et al. | |
| 2015/0175489 A1 | * | 6/2015 | McCauley | B29C 35/00 |
| | | | | 501/1 |
| 2016/0137558 A1 | * | 5/2016 | Watanabe | C04B 35/64 |
| | | | | 264/630 |
| 2016/0346776 A1 | | 12/2016 | Omiya et al. | |
| 2018/0243942 A1 | * | 8/2018 | Kitaguchi | C04B 38/0006 |
| 2019/0300444 A1 | * | 10/2019 | Kitaguchi | B28B 19/0038 |
| 2022/0178292 A1 | * | 6/2022 | Boger | F01N 13/008 |

FOREIGN PATENT DOCUMENTS

| | | | |
|---|---|---|---|
| JP | H07-260440 A | 10/1995 | |
| JP | 2002-267427 A | 9/2002 | |
| JP | 6376701 B2 | 8/2018 | |
| WO | 2020/205195 A1 | 10/2020 | |
| WO | WO-2021188373 A1 * | 9/2021 | .............. F27B 9/028 |

OTHER PUBLICATIONS

German Office Action (Application No. 10 2022 000 550.6) dated Mar. 28, 2025 (with English translation) (10 pages).

* cited by examiner

Exhaust gas

METHOD FOR MANUFACTURING PILLAR-SHAPED HONEYCOMB FIRED BODY

CROSS REFERENCE TO RELATED APPLICATIONS

The present invention claims the benefit of priority to Japanese Patent Application No 2021-054152 filed on Mar. 26, 2021 with the Japanese Patent Office, the entire contents of which are incorporated herein by reference in its entirety.

FIELD OF THE INVENTION

The present invention relates to a method for manufacturing a pillar-shaped honeycomb fired body.

BACKGROUND OF THE INVENTION

Pillar-shaped honeycomb fired bodies are widely used as catalyst carriers, various filters, and the like. Recently, their use as a diesel particulate filter (DPF) and a gasoline particulate filter (GPF) for capturing particulate matter emitted from a diesel engine has attracted particular attention.

A pillar-shaped honeycomb fired body can be manufactured by kneading a raw material composition obtained by adding various additive agents to a ceramic raw material, a pore-forming material, a binder and water, thereby obtaining a green body, and subjecting it to extrusion molding through a predetermined die thereby preparing a pillar-shaped honeycomb formed body, and cutting the honeycomb formed body to a predetermined length, and then drying and firing it. An annular member called a mask or a holding plate is adjacently attached to the downstream of the die used for the extrusion molding, which defines the contour of the outer peripheral side surface of the pillar-shaped honeycomb formed body (example: Japanese Patent No. 6376701).

Measuring the external dimensions of a pillar-shaped honeycomb structure such as a pillar-shaped honeycomb formed body and a pillar-shaped honeycomb fired body is an important matter in terms of quality control, and a number of measuring methods have been conventionally known. For example, Japanese Patent Application Publication No. H07-260440 discloses a method for measuring a three-dimensional outer shape of an object in which an arm equipped with multiple laser displacement meters at different heights is rotated around the object placed on a plane perpendicular to the axis of rotation of this arm. Japanese Patent Application Publication No. 2002-267427 discloses a method for measuring the outer shape of a honeycomb structure characterized in that an end face of a honeycomb structure is imaged to obtain an original image, an average brightness of the outer wall portion of the honeycomb structure in the obtained original image is obtained, and a filled image is obtained by filling an inside of the honeycomb structure with the obtained average brightness gradation on the original image, and the outer shape is measured by performing edge detection processing on the obtained filled image.

PRIOR ART

Patent Literature

[Patent Literature 1] Japanese Patent No. 6376701
[Patent Literature 2] Japanese Patent Application Publication No. H07-260440

[Patent Literature 3] Japanese Patent Application Publication No. 2002-267427

SUMMARY OF THE INVENTION

Shrinkage occurs in the firing process of a honeycomb formed body. Therefore, the designed dimensions of a honeycomb formed body are determined in consideration of the shrinkage amount or the shrinkage factor so that the honeycomb fired body is within the dimensional tolerance. It is considered that the shrinkage amount or the shrinkage factor can be grasped by measuring the outer diameters before and after firing. However, although conventional external dimension measurement techniques can grasp the difference in the external dimensions of the honeycomb formed body and the honeycomb fired body, they are insufficient in terms of accurately grasping the shrinkage amount, so it was not always possible to obtain a honeycomb fired body that satisfied the dimensional tolerance with a sufficiently high yield.

The present invention has been made in view of the above circumstances, and one embodiment of the present invention aims at providing a method for manufacturing a pillar-shaped honeycomb fired body, which enables the production of a pillar-shaped honeycomb fired body with high dimensional accuracy.

As a result of diligent studies to solve the above problems, the present inventors have found that the firing shrinkage is not uniform and the shrinkage factor varies depending on the portions of a honeycomb formed body. It is considered that this is because the heat history received in a firing furnace differs depending on the portions of the honeycomb formed body due to the position of the burners and the influence of the gas flow in the furnace. Therefore, for example, even if the average shrinkage factor is calculated on the premise that the honeycomb formed body shrinks uniformly and the dimensions of the honeycomb formed body are determined based on the average shrinkage factor, the dimensional accuracy of the portions that deviates from the average shrinkage factor becomes worse as the shrinkage is not actually uniform.

Further, even if conventional external dimension measuring techniques can measure the external dimensions and the position of the center of gravity of a honeycomb structure, they are insufficient to accurately grasp the firing shrinkage. According to the research results of the present inventors, it is important to calculate the firing shrinkage based on the portion that was located at the center of a die when the green body passed through the die. The present invention has been completed based on the above findings, and is exemplified as below.

[1] A method for manufacturing a pillar-shaped honeycomb fired body having an outer peripheral side surface and partition walls that are disposed on an inner peripheral side of the outer peripheral side surface and partition a plurality of cells each forming a flow path from a first end surface to a second end surface, the method comprising:

a step A1 of preparing a first pillar-shaped honeycomb formed body by performing extrusion molding of a green body comprising a ceramic raw material, a pore-forming material, a binder and a dispersion medium, through a die that defines opening shapes of the plurality of cells, and an annular mask that is disposed downstream of the die and has an inner peripheral contour for defining an outer peripheral contour of the first end surface and the second end surface;

a step B1 of drying the first pillar-shaped honeycomb formed body to obtain a first pillar-shaped honeycomb dried body;

a step C1 of measuring an actual distance from a portion that has been located at a center of the die when the green body passes through the die to the outer peripheral side surface at every predetermined angle for one round in at least one of the first end surface and the second end surface of the first pillar-shaped honeycomb dried body;

a step D1 of firing the first pillar-shaped honeycomb dried body to obtain a first pillar-shaped honeycomb fired body by;

a step E1 of measuring an actual distance from the portion that has been located at the center of the die when the green body passes through the die to the outer peripheral side surface at every predetermined angle for one round in at least one of the first end surface and the second end surface of the first pillar-shaped honeycomb fired body;

a step F1 of calculating a ratio or difference for the every predetermined angle between the actual distance from the portion to the outer peripheral side surface of the first pillar-shaped honeycomb dried body obtained in the step C1 and the actual distance from the portion to the outer peripheral side surface of the first pillar-shaped honeycomb fired body obtained in the step E1;

a step G1 of predicting a firing shrinkage for the every predetermined angle based on the ratio or the difference calculated for the every predetermined angle in the step F1, and generating a target contour for at least one of the first end surface and the second end surface of the pillar-shaped honeycomb dried body such that a contour of at least one of the first end surface and the second end surface of the pillar-shaped honeycomb fired body prepared from a next time onward is closer to a designed contour than the first pillar-shaped honeycomb fired body;

a step H1 of preparing an annular mask with a modified inner peripheral contour such that the contour of at least one of the first end surface and the second end surface of the pillar-shaped honeycomb dried body prepared from the next time onward is closer to the target contour than the first pillar-shaped honeycomb dried body;

a step A2 of preparing a second pillar-shaped honeycomb formed body by performing extrusion molding of a green body comprising a ceramic raw material, a pore-forming material, a binder and a dispersion medium, through a die that defines opening shapes of the plurality of cells, and the annular mask prepared by the step H1 that is disposed downstream of the die and has the inner peripheral contour for defining the contours of the first end surface and the second end surface;

a step B2 of drying the second pillar-shaped honeycomb formed body to obtain a second pillar-shaped honeycomb dried body whose contour of at least one of the first end surface and the second end surface is closer to the target contour than the first pillar-shaped honeycomb dried body; and a step D2 of firing the second pillar-shaped honeycomb dried body in a state where its orientation is adjusted such that the contour of at least one of the first end surface and the second end surface of a second pillar-shaped honeycomb fired body obtained by firing the second pillar-shaped honeycomb dried body is closer to the designed contour than that of the first pillar-shaped honeycomb fired body, whereby to obtain the second pillar-shaped honeycomb fired body, whose contour is corrected.

[2] The method according to [1], wherein the step D1 and the step D2 comprise performing the firing while the first and the second pillar-shaped honeycomb dried bodies pass through a continuous firing furnace in a state where they are placed on a shelf board so that the extending direction of the cells is parallel to a direction of gravity.

[3] The method according to [1] or [2], wherein in the step A1 and the step A2, a direction of the extrusion molding is horizontal.

[4] The method according to any one of [1] to [3], wherein the designed contour of the first end surface and the second end surface of the first and the second pillar-shaped honeycomb fired bodies are non-homothetic shapes to the inner peripheral contour of the annular mask prepared by the step H1.

[5] The method according to any one of [1] to [4], wherein in the step A1 and the step A2, a direction of the extrusion molding is horizontal;

the step D1 and the step D2 comprise performing the firing while the first and the second pillar-shaped honeycomb dried bodies pass through a continuous firing furnace in a state where they are placed on a shelf board so that the extending direction of the cells is parallel to a direction of gravity;

the designed contour of the first and the second end surfaces of the first and the second pillar-shaped honeycomb fired bodies are perfect circles;

the inner peripheral contour of the annular mask prepared by the step H1 comprises three curved portions that bulge outward with respect to a maximum perfect circle inscribed in the inner peripheral contour, and assuming each of the curved portions is referred to as a first curved portion, a second curved portion, and a third curved portion in this order, and assuming a most outwardly bulging part of each of the curved portions is a center of each of the curved portions, a central angle $\theta 1$ between the center of the first curved portion and the center of the second curved portion is from 80° to 100°, a central angle $\theta 2$ between the center of the second curved portion and the center of the third curved portion is from 125° to 145°, and a central angle $\theta 3$ between the center of the third curved portion and the center of the first curved portion is from 125° to 145°; and the step D2 comprises adjusting the orientation of the second pillar-shaped honeycomb dried body placed on the shelf board such that a portion of the second pillar-shaped honeycomb dried body corresponding to the center of the third curved portion is located at a rear side in a traveling direction in the continuous firing furnace.

[6] The method according to any one of [1] to [5], wherein the every predetermined angle in the step C1 and the step E1 is 60° or less.

According to the method for manufacturing a pillar-shaped honeycomb fired body in an embodiment of the present invention, it is possible to accurately grasp the firing shrinkage that varies depending on the locations, so that it becomes possible to manufacture a pillar-shaped honeycomb fired body with high dimensional accuracy. In other words, it is possible to obtain pillar-shaped honeycomb fired bodies that satisfy dimensional tolerance with a higher yield. Further, according to the method for manufacturing a pillar-shaped honeycomb fired body in an embodiment of the present invention, it becomes possible to easily manufacture a pillar-shaped honeycomb fired body having targeted dimensions, and therefore, it is also possible to ease the dimensional control values when making a pillar-shaped honeycomb formed body. This also makes it possible to further improve productivity.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

(1. Pillar-Shaped Honeycomb Fired Body)

According to one embodiment of the present invention, there is provided a method for manufacturing a pillar-shaped honeycomb fired body. The use of the pillar-shaped honeycomb fired body is not particularly limited. For example, it can be used in various industrial applications such as heat sinks, filters (example: GPF, DPF), catalyst carriers, sliding parts, nozzles, heat exchangers, electrical insulating members and parts for semiconductor manufacturing equipment.

Figure 1:
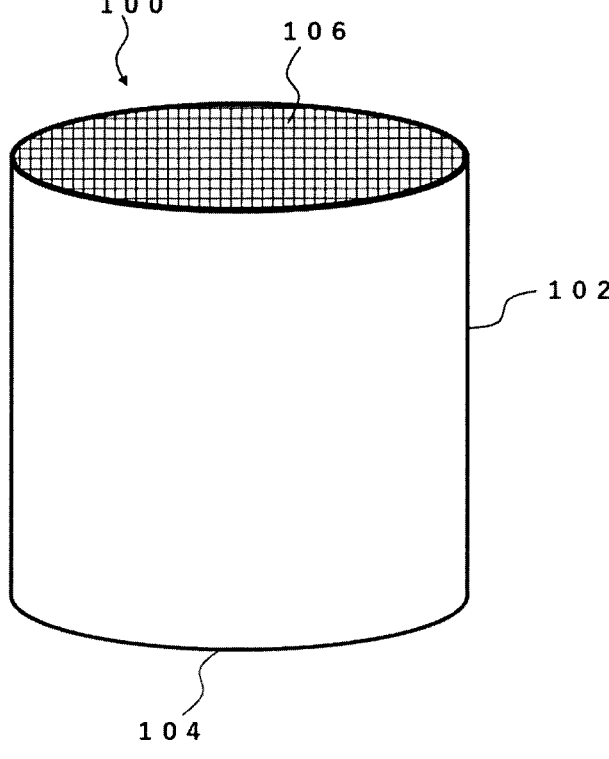
FIG. 1 is a perspective view schematically showing a wall-through type honeycomb fired body.
Figure 2:
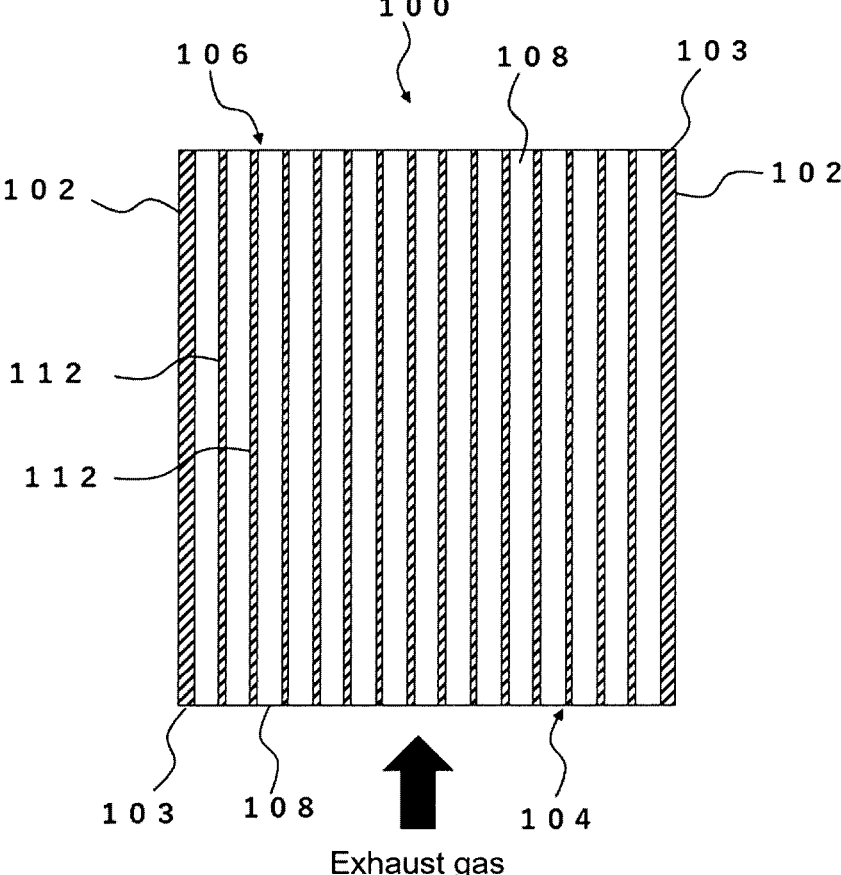
FIG. 2 is a schematic cross-sectional view of a wall-through type honeycomb fired body observed from a direction orthogonal to the direction in which the cells extend.

FIGS. 1 and 2 illustrate schematic a perspective view and a cross-sectional view of a pillar-shaped honeycomb fired body 100 applicable as a wall-through type exhaust gas filter and/or catalyst carrier for automobiles, respectively. The pillar-shaped honeycomb fired body 100 has a honeycomb structure comprising an outer peripheral side wall 103 having an outer peripheral side surface 102, and partition walls 112 that are disposed on the inner peripheral side of the outer peripheral side wall 103 and partition a plurality of cells 108 each forming a flow path from a first end surface 104 to a second end surface 106. In the pillar-shaped honeycomb fired body 100, both ends of each cell 108 are open, and the exhaust gas flowing into one cell 108 from the first end surface 104 is purified while passing through the cell 108, and flows out from the second end surface 106.

Figure 3:
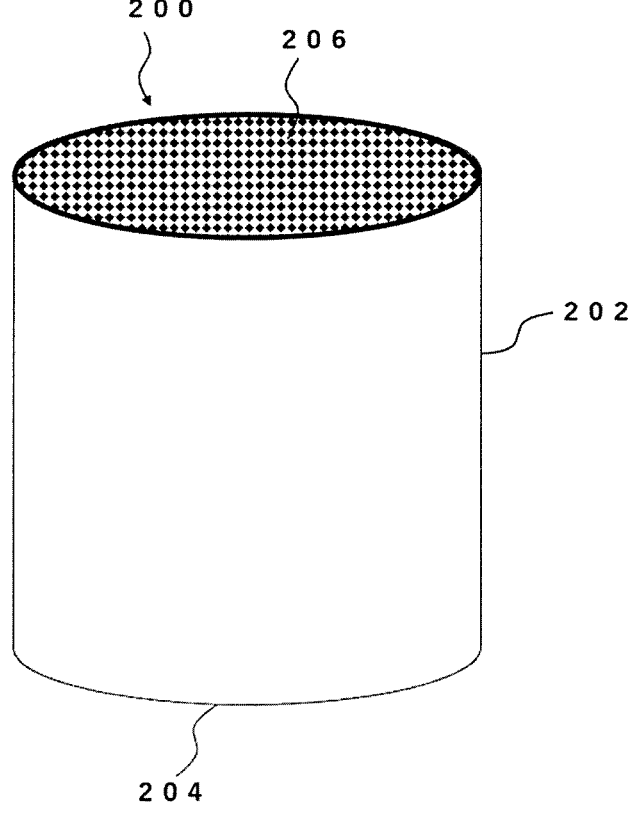
FIG. 3 is a perspective view schematically showing a wall-flow type honeycomb fired body.
Figure 4:
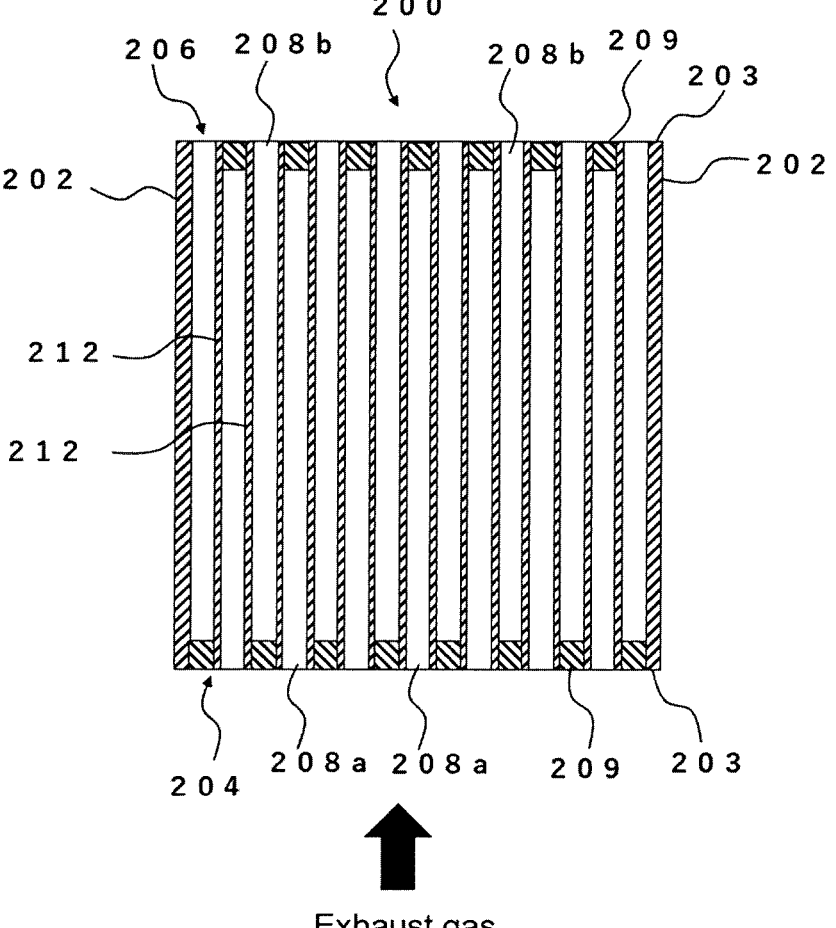
FIG. 4 is a schematic cross-sectional view of a wall-flow type honeycomb fired body observed from a direction orthogonal to the direction in which the cells extend.

FIGS. 3 and 4 illustrate schematic a perspective view and a cross-sectional view of a pillar-shaped honeycomb fired body 200 applicable as a wall-flow type exhaust gas filter and/or catalyst carrier for automobiles, respectively. The pillar-shaped honeycomb fired body 200 has a honeycomb structure comprising an outer peripheral side wall 203 having an outer peripheral side surface 202, and partition walls 212 that are disposed on the inner peripheral side of the outer peripheral side wall 203 and partition a plurality of cells 208a, 208b each forming a flow path from a first end surface 204 to a second end surface 206.

In the pillar-shaped honeycomb fired body 200, the plurality of cells 208a, 208b can be classified into a plurality of first cells 208a disposed inside the outer peripheral side wall 203, each extending from the first end surface 204 to the second end surface 206, opening on the first end surface 204 and having a plugged portion 209 on the second end surface 206, and a plurality of second cells 208b disposed inside the outer peripheral side wall 203, each extending from the first end surface 204 to the second end surface 206, having a plugged portion 209 on the first end surface 204 and opening on the second end surface 206. Further, in the pillar-shaped honeycomb fired body 200, the first cells 208a and the second cells 208b are alternately arranged adjacent to each other with the partition wall 212 interposed therebetween.

When exhaust gas containing particulate matter such as soot is supplied to the first end surface 204 on the upstream side of the pillar-shaped honeycomb fired body 200, the exhaust gas is introduced into the first cells 208a and proceeds downstream in the first cells 208a. Since the first cells 208a have plugged portions 209 on the second end surface 206 on the downstream side, the exhaust gas penetrates the partition walls 212 that partition the first cells 208a and the second cells 208b, and flows into the second cells 208b. Since soot cannot pass through the partition walls 212, it is collected and deposited in the first cells 208a. After the soot is removed, the clean exhaust gas that has flowed into the second cells 208b proceeds downstream in the second cells 208b and flows out from the second end surface 206 on the downstream side.

Examples of the material constituting the pillar-shaped honeycomb fired body include, but are not limited to, ceramics. As for the types of ceramics, mention can be made to cordierite, mullite, zirconium phosphate, aluminum titanate, silicon carbide (SiC), silicon-silicon carbide composite (example: Si-bonded SiC), cordierite-silicon carbide composite, zirconia, spinel, indialite, sapphirine, corundum, titania, silicon nitride, and the like. Further, these ceramics may contain one type alone, or two or more types.

The shape of the end surfaces of the pillar-shaped honeycomb structure filter is not limited, and it may be, for example, a round shape such as a circle, an ellipse, a race track shape, or an oval shape, or a polygon such as a triangle or a quadrangle. The pillar-shaped honeycomb fired bodies 100, 200 shown in FIGS. 1 to 4 have circular end surfaces and are cylindrical as a whole.

The height of the pillar-shaped honeycomb fired body (the length from the first end surface to the second end surface) is not particularly limited and may be appropriately set according to the application and required performance.

There is no particular limitation on the relationship between the height of the pillar-shaped honeycomb fired body and the maximum diameter of each end surface (referring to the maximum length of the diameters passing through the center of gravity of each end surface of the pillar-shaped honeycomb fired body). Therefore, the height of the pillar-shaped honeycomb fired body may be longer than the maximum diameter of each end surface, or the height of the pillar-shaped honeycomb fired body may be shorter than the maximum diameter of each end surface.

The shape of the cells in the cross-section perpendicular to the direction in which the cells extend is not limited, but is preferably a quadrangle, a hexagon, an octagon, or a combination thereof. Among these, a square and a hexagon are preferred. By making the shape of the cells in this way, it is possible to reduce the pressure loss when a fluid is flowed through the pillar-shaped honeycomb fired body.

The thickness of the partition wall is preferably 150 μm or more, more preferably 170 μm or more, and even more preferably 190 μm or more, from the viewpoint of increasing the strength of the pillar-shaped honeycomb fired body and the collection efficiency in the case of filter applications. Further, the thickness of the partition wall is preferably 260 μm or less, more preferably 240 μm or less, and even more preferably 220 μm or less, from the viewpoint of suppressing the pressure loss when a fluid is flowed through the pillar-shaped honeycomb fired body. In the present specification, the thickness of the partition wall refers to a crossing length of a line segment that crosses the partition wall when the centers of gravity of adjacent cells are connected by this line segment in a cross section orthogonal to the direction in which the cells extend. The average thickness of partition wall refers to the average value of the thickness of all the partition walls.

The cell density (number of cells per unit cross-sectional area perpendicular to the direction in which the cells extend) is not particularly limited, but may be, for example, 6 to 2000 cells/square inch (0.9 to 311 cells/cm$^2$), more preferably 50 to 1000 cells/square inch (7.8 to 155 cells/cm$^2$), particularly preferably 100 to 400 cells/square inch (15.5 to 62.0 cells/cm$^2$). Here, the cell density is calculated by dividing the area of one end surface of the pillar-shaped honeycomb fired body 100, 200 excluding the outer peripheral side wall by the total opening area of the cells on this end surface (if there are plugged cells, it is calculated assuming the cells are not plugged).

The partition walls can be porous. The porosity of the partition wall may be appropriately adjusted according to the application, but from the viewpoint of suppressing the pressure loss of the fluid, it is preferably 40% or more, more preferably 50% or more, and even more preferably 60% or more. In addition, the porosity of the partition wall is preferably 80% or less, more preferably 75% or less, and even more preferably 70% or less, from the viewpoint of ensuring the strength of the honeycomb fired body. The porosity is measured by a mercury intrusion method in accordance with JIS R1655: 2003 using a mercury porosimeter.

When the pillar-shaped honeycomb fired body 100, 200 is used as a catalyst carrier, the surface of the partition walls 112, 212 can be coated with a catalyst according to the purpose. The catalyst is not limited, but mention can be made to an oxidation catalyst (DOC) for raising the exhaust gas temperature by oxidative combustion of hydrocarbons (HC) and carbon monoxide (CO), a PM combustion catalyst that assists the combustion of PM such as soot, an SCR catalyst and an NSR catalyst for removing nitrogen oxides (NO$_x$), and a three-way catalyst capable of simultaneously removing hydrocarbons (HC), carbon monoxide (CO) and nitrogen oxides (NO$_x$). The catalyst can appropriately contain, for example, precious metals (Pt, Pd, Rh, and the like), alkali metals (Li, Na, K, Cs, and the like), alkaline earth metals (Mg, Ca, Ba, Sr, and the like), rare earths (Ce, Sm, Gd, Nd, Y, La, Pr, and the like), transition metals (Mn, Fe, Co, Ni, Cu, Zn, Sc, Ti, Zr, V, Cr, and the like) and the like.

(2. Method for Manufacturing a Pillar-Shaped Honeycomb Fired Body)

Hereinafter, each step of a method for manufacturing a pillar-shaped honeycomb fired body according to one embodiment of the present invention will be described in detail.

(Step A1: Preparation of a First Pillar-Shaped Honeycomb Formed Body)

In the step A1, a first pillar-shaped honeycomb formed body is prepared by performing extrusion molding of a green body comprising a ceramic raw material, a pore-forming material, a binder and a dispersion medium, through a die that defines opening shapes of a plurality of cells, and an annular mask that is disposed downstream of the die and has an inner peripheral contour for defining the outer peripheral contour of the first end surface and the second end surface.

The ceramic raw material is a raw material of the component that remains after firing and constitutes the skeleton of the honeycomb fired body as ceramics, such as a metal oxide, a metal, or the like. The ceramic raw material can be provided, for example, in the form of powder. Examples of the ceramic raw material include a raw material for obtaining ceramics such as cordierite, mullite, zircon, aluminum titanate, silicon carbide, silicon nitride, zirconia, spinel, indialite, sapphirine, corundum, titania, and the like. Specific examples thereof include, but are not limited to, silica, talc, alumina, kaolin, serpentine, pyrophyllite, brucite, boehmite, mullite, magnesite, aluminum hydroxide, and the like. As the ceramic raw material, one type may be used alone, or two or more types may be used in combination.

In the case of filter applications such as DPF and GPF, cordierite can be preferably used as the ceramics. In this case, a cordierite-forming raw material can be used as the ceramic raw material. A cordierite-forming raw material is a raw material that becomes cordierite by firing. It is desirable that the cordierite-forming raw material have a chemical composition of alumina (Al$_2$O$_3$) (including the amount of aluminum hydroxide that converts to alumina): 30 to 45% by mass, magnesia (MgO): 11 to 17% by mass, and silica (SiO$_2$): 42 to 57% by mass.

The pore-forming material is not particularly limited as long as it becomes pores after firing, and examples thereof include, wheat flour, starch, foamed resin, water-absorbing resin, silica gel, carbon (example: graphite), ceramic balloon, polyethylene, polystyrene, polypropylene, nylon, polyester, acrylic resin, phenol resin, resin foam (after foaming), resin foam (before foaming), and the like. As the pore-forming material, one type may be used alone, or two or more types may be used in combination. From the viewpoint of increasing the porosity of the pillar-shaped honeycomb fired body, the amount of the pore-forming material is preferably 0.5 parts by mass or more, more preferably 2 parts by mass or more, and even more preferably 3 parts by mass or more with respect to 100 parts by mass of the ceramic raw material. From the viewpoint of ensuring the strength of the pillar-shaped honeycomb fired body, the amount of the pore-forming material is preferably 10 parts by mass or less, more preferably 7 parts by mass or less, and even more preferably 4 parts by mass or less with respect to 100 parts by mass of the ceramic raw material.

Examples of the binder include organic binders such as methyl cellulose, hydroxypropylmethyl cellulose, hydroxy-propoxyl cellulose, hydroxyethyl cellulose, carboxymethyl cellulose, and polyvinyl alcohol. In particular, it is prefer-able to use methyl cellulose and hydroxypropoxyl cellulose in combination. Further, from the viewpoint of increasing the strength of the honeycomb formed body, the amount of the binder is preferably 4 parts by mass or more, more preferably 5 parts by mass or more, and even more prefer-ably 6 parts by mass or more with respect to 100 parts by mass of the ceramic raw material. From the viewpoint of suppressing the occurrence of cracking due to abnormal heat generation in the firing step, the amount of the binder is preferably 9 parts by mass or less, more preferably 8 parts by mass or less, and even more preferably 7 parts by mass or less with respect to 100 parts by mass of the ceramic raw material. As the binder, one type may be used alone, or two or more types may be used in combination.

Examples of the dispersion medium include water or a mixed solvent of water and an organic solvent such as alcohol, and water can be particularly preferably used. The amount of the dispersion medium of the pillar-shaped hon-eycomb formed body is preferably 20 to 90 parts by mass, more preferably 60 to 85 parts by mass, and even more preferably 70 to 80 parts by mass with respect to 100 parts by mass of the ceramic raw material. When the amount of water of the pillar-shaped honeycomb formed body is 20 parts by mass or more with respect to 100 parts by mass of the ceramic raw material, it is easy to obtain the advantage that the quality of the pillar-shaped honeycomb formed body is readily stabilized. When the amount of water of the pillar-shaped honeycomb formed body is 90 parts by mass or less with respect to 100 parts by mass of the ceramic raw material, the amount of shrinkage during drying becomes smaller and deformation can be suppressed. In the present specification, the amount of water of the pillar-shaped honeycomb formed body refers to a value measured by a loss on drying method.

Additive agents such as a dispersant can be added to the green body as needed. As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

Figure 5:
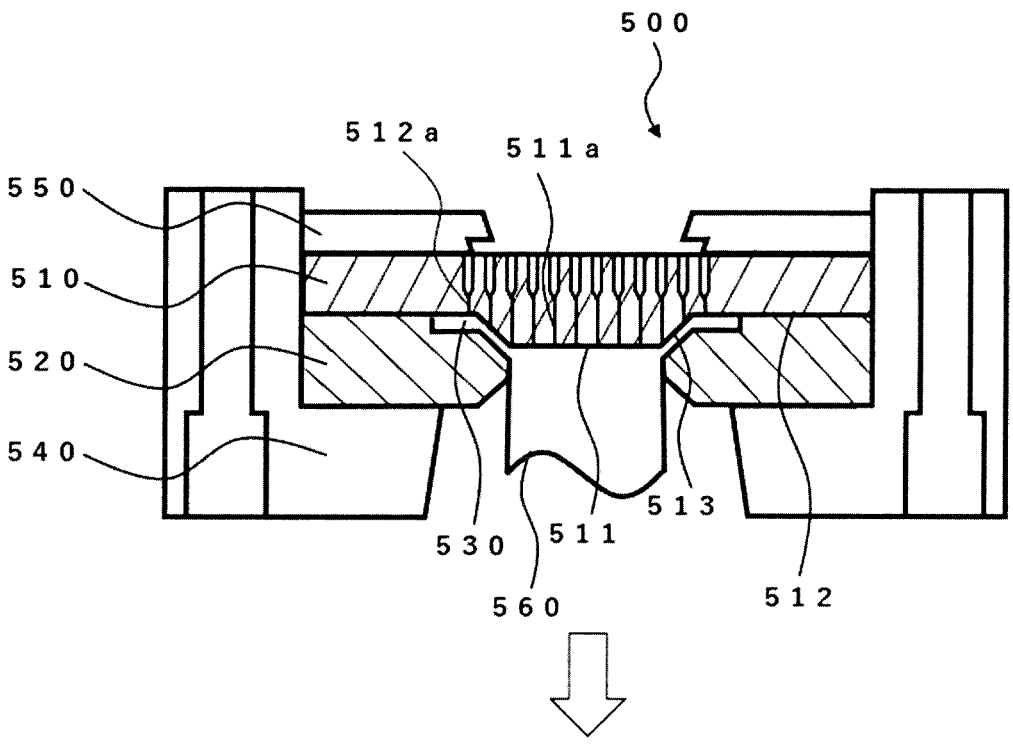
FIG. 5 is a schematic view showing a cross-sectional structure of an extrusion molding device when observed from a direction orthogonal to the extrusion direction.

FIG. 5 schematically shows the cross-sectional structure of an extrusion molding device when observed from a direction orthogonal to the extrusion direction. The extru-sion molding device 500 comprises a die 510 having slits 511a, 512a for extruding the raw material for molding, and an annular mask 520 provided on the downstream side of the die 510. In the extrusion molding device 500, the die 510 has an inner portion 511 and an outer peripheral portion 512. The inner portion 511 projects to the downstream side (down-ward direction in FIG. 5), and a step portion 513 is formed between the inner portion 511 and the outer peripheral portion 512. Further, the inner portion 511 is provided with a slit 511a that defines a honeycomb structure having a desired cell shape, partition wall thickness, cell density and the like. The outer peripheral portion 512 is provided with a slit 512a which is shorter than the slit 511a of the inner portion 511. A gap portion 530 for forming the outer peripheral wall of a honeycomb structure is formed between the die 510 and the annular mask 520. A back holding plate 550 for fixing the die 510 is attached to the upstream side of the die 510. Further, a holding jig 540 attached so as to surround the outer peripheral side of the annular mask 520, the outer peripheral side of the die 510, and the outer peripheral side of the back holding plate 550 from the downstream side of the annular mask 520 serves as a holder that fixes the die 510 and the annular mask 520.

Upon extrusion molding by the extrusion molding device 500, the molding raw material is extruded from the upstream side (upper side in FIG. 5) of the die 510 to the downstream side through the die 510 by an extruder (not shown). Then, the molding raw material extruded from the slit 511a pro-vided in the inner portion 511 of the die 510 whose down-stream side is open forms a honeycomb structure having a plurality of cells. On the other hand, the molding raw material extruded from the slit 512a provided in the outer peripheral portion 512 of the die 510 has its honeycomb structure crushed by the function of the gap portion 530 and changes the traveling direction from the extrusion direction to the direction along the step portion 513. After the molding raw material passes through the gap portion 530, it changes its traveling direction again to the extrusion direction and forms the outer peripheral wall surrounding the cells. In this way, the pillar-shaped honeycomb formed body 560 is continuously formed from the extrusion molding device 500. The direction of extrusion molding is not particularly limited and may be, for example, a horizontal direction or a vertical direction, but from the viewpoint of continuously forming a long pillar-shaped honeycomb formed body, the horizontal direction is preferable.

Figure 6:
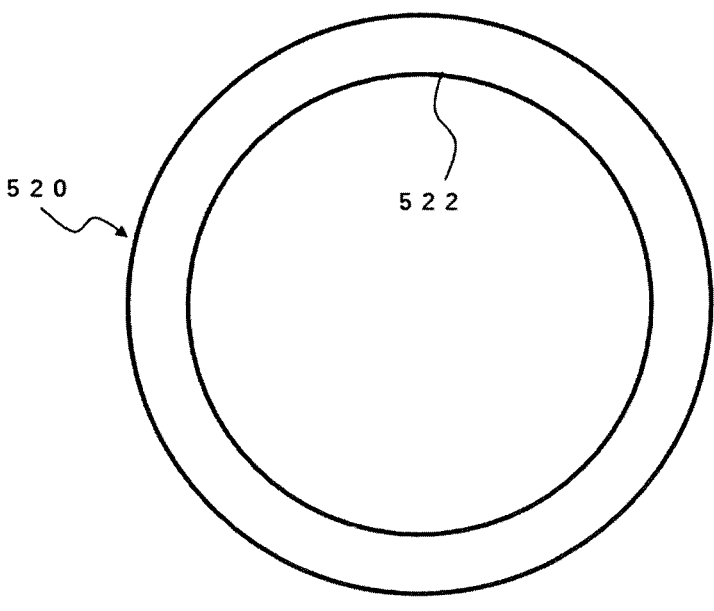
FIG. 6 is a schematic front view of an annular mask.

FIG. 6 shows a schematic front view of the annular mask 520. The annular mask 520 has an inner peripheral contour 522 for defining the outer peripheral contour of the first end surface and the second end surface of the first pillar-shaped honeycomb formed body. The inner peripheral contour 522 of the annular mask 520 used in the step A1 may have a homothetic shape or a non-homothetic shape to the designed contour of the first end surface and the second end surface of the first pillar-shaped honeycomb formed body.

(Step B1: Drying of the First Pillar-Shaped Honeycomb Formed Body)

Next, the step B1 is carried out in which the first pillar-shaped honeycomb formed body is dried to obtain a first pillar-shaped honeycomb dried body. In the drying step, conventionally known drying methods such as hot gas drying, microwave drying, dielectric drying, reduced-pres-sure drying, vacuum drying, and freeze drying can be used. Among these, a drying method that combines hot gas drying with microwave drying or dielectric drying is preferable in that the entire formed body can be dried quickly and uniformly.

When forming plugged portions, the plugged portions are formed on both end surfaces of the dried pillar-shaped honeycomb formed body and then the plugged portions are dried to obtain a pillar-shaped honeycomb dried body. The material of the plugged portion is not particularly limited, but ceramics are preferable from the viewpoint of strength and heat resistance. As the ceramics, it is preferably a ceramic raw material comprising at least one selected from the group consisting of cordierite, mullite, zircon, aluminum titanate, silicon carbide, silicon nitride, zirconia, spinel, indialite, sapphirine, corundum, and titania. The plugged portion is preferably formed of a material containing 50% by mass or more of these ceramics, and more preferably formed of a material containing 80% by mass or more of these ceramics in total. It is even more preferable that the plugged portion have the same material composition as the main body portion of the honeycomb formed body because the expansion coefficient at the time of firing can be the same so that the durability is improved.

An exemplary method for forming the plugged portions will be described. A plugging slurry is stored in a storage container. Next, a mask having openings at positions corresponding to the cells on which the plugged portions should be formed is attached to one of the end surfaces. The end surface with the mask attached is immersed in the storage container, and the openings are filled with the plugging slurry to form the plugged portions. Plugged portions can also be formed on the other end surface in the same manner.

(Step C1: Measurement of the Distance from the Center of the Die to the Outer Peripheral Side Surface of the First Pillar-Shaped Honeycomb Dried Body)

Figure 7:
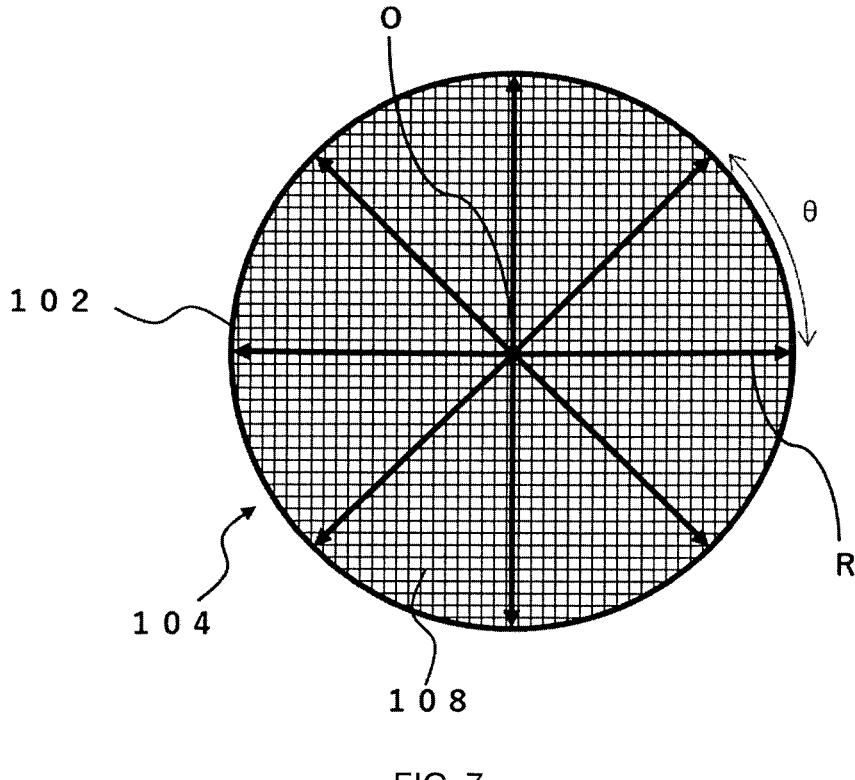
FIG. 7 is a schematic bottom view of a pillar-shaped honeycomb dried body or a fired body for explaining the method of measuring the actual distances R from the portion that has been located at the center O of the die when the green body passes through the die to the outer peripheral side surface at every predetermined angle θ for one round.

In the step C1, for at least one of the first end surface and the second end surface of the first pillar-shaped honeycomb dried body, the actual distance R from a portion that has been located at the center O of the die when the green body passes through the die to the outer peripheral side surface 102 is measured at every predetermined angle θ for one round (see FIG. 7). The first end surface and the second end surface have substantially the same contour according to the manufacturing method. Therefore, it is sufficient to carry out the step C1 on the end surface of either the first end surface or the second end surface. When carrying out the step C1, the smaller the predetermined angle θ is, the more accurately the firing shrinkage corresponding to portions of the honeycomb formed body can be predicted. Therefore, the predetermined angle is preferably 60° or less, more preferably 45° or less, further preferably 22.5° or less, even more preferably 10° or less, even more preferably 5° or less, even more preferably 1° or less, and even more preferably 0.5° or less. However, if the predetermined angle θ is too small, the number of measurement points increases, and the effect of improving the prediction accuracy has a limitation. Therefore, it is preferable that the predetermined angle be 0.01° or more, and more preferably 0.1° or more.

Figure 8:
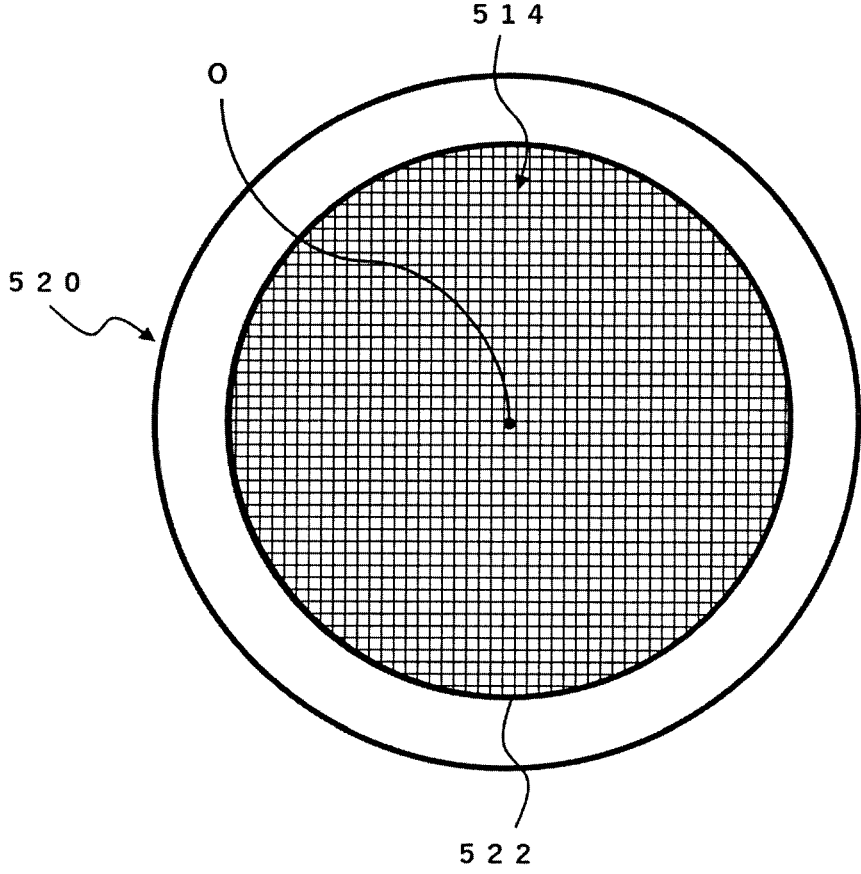
FIG. 8 schematically shows the outlet face of a die that is visible at the inside of the opening of an annular mask when the outlet face of the die is observed from the downstream side of an extrusion molding device.

The portion that has been located at the center of the die can be specified, for example, as follows. First, when the designed contour of the end surface of the pillar-shaped honeycomb fired body is a perfect circle, the center of the die can be the position of the center of gravity of the outlet face when the outlet face of the die is observed from the downstream side of the extrusion molding device. When the designed contour of the end surface of the pillar-shaped honeycomb fired body has other shapes, a position other than the center of gravity may be defined as the center. FIG. 8 schematically shows the outlet face 514 of the die that is visible at the inside of the opening of the annular mask 520 when the outlet face 514 of the die is observed from the downstream side of the extrusion molding device 500. For example, when the opening of the annular mask 520 is a perfect circle, the center of gravity O on the outlet face 514 of the die visible at the inside of the opening can be defined as the center of the die. When the indicator for specifying each cell such as numbers and coordinates is given to each cell that is visible on the outlet face 514, the position of the center of gravity O can be specified in association with the cell arrays defined by the slit on the outlet face 514 of the die. For example, the center of gravity O can be specified to be located at the lower left corner of the cell which is at $n^{th}$ from the top and $m^{th}$ from the left. Alternatively, the center of gravity O can be specified to be located at the center of gravity of the cell which is at $n^{th}$ from the top and $m^{th}$ from the left. Alternatively, the position that has been located at the center of the die at the time of extrusion molding may be specified based on the designed positional relationship of the honeycomb formed body, the die and the annular mask.

(Step D1: Firing of the First Pillar-Shaped Honeycomb Dried Body)

In the step D1, the first pillar-shaped honeycomb dried body is fired to obtain a first pillar-shaped honeycomb fired body. A degreasing step may be performed prior to the firing. The combustion temperature of the binder is about 200° C., and the combustion temperature of the pore-forming material is about 300 to 1000° C. Therefore, the degreasing step may be carried out by heating the honeycomb formed body in the range of about 200 to 1000° C. The heating time is not particularly limited, but is normally about 10 to 100 hours. The honeycomb formed body after the degreasing step is called a calcined body. The firing step depends on the material composition of the pillar-shaped honeycomb dried body, but can be performed, for example, by heating the calcined body to 1350 to 1600° C. and maintaining it for 3 to 10 hours.

In the firing furnace, a plurality of burners, as well as inlets and outlets for gases such as air are provided at predetermined positions. As a result, the heat history that the pillar-shaped honeycomb dried body receives while passing through the firing furnace differs depending on the portions. For example, a portion near the burner will receive more heat energy. Further, from an industrial point of view, the pillar-shaped honeycomb dried body is often fired while passing through a continuous firing furnace. In this case, the first pillar-shaped honeycomb dried body can be fired in a state where it is placed on a shelf board so that the extending direction of the cells is parallel to the direction of gravity while it passes through the continuous firing furnace. The heat history also varies depending on the position where the pillar-shaped honeycomb dried body is placed on the shelf board. As a result, the shrinkage amount (or the shrinkage factor) generated by the firing varies depending on the portions of the pillar-shaped honeycomb dried body, for example, the front-side portion, the rear-side portion, the left-side portion, and the right-side portion with respect to the traveling direction of the pillar-shaped honeycomb dried body in the furnace.

(Step E1: Measurement of Distance from the Center of the Die to the Outer Peripheral Side Surface of the First Pillar-Shaped Honeycomb Fired Body)

In the step E1, for at least one of the first end surface and the second end surface of the first pillar-shaped honeycomb fired body, the actual distance R from the portion that has been located at the center O of the die when the green body passes through the die to the outer peripheral side surface 102 is measured at every predetermined angle for one round (see FIG. 7). The method of carrying out the step E1 is the same as that of the step C1 described above. By associating the measurement locations of the distance R with those in the step C1, the firing shrinkage, which varies depending on the portions can be accurately calculated in the next step.

(Step F1: Calculation of Firing Shrinkage)

Next, a ratio or difference between the actual distance from said portion to the outer peripheral side surface of the first pillar-shaped honeycomb dried body obtained in the step C1 and the actual distance from said portion to the outer peripheral side surface of the first pillar-shaped honeycomb fired body obtained in the step E1 is calculated for the every predetermined angle. As a result, the shrinkage amount or the shrinkage factor at the time of firing can be grasped for each portion of the honeycomb fired body. Here, the shrinkage factor refers to the distance R before firing/the distance R after firing.

As described above, the shrinkage amount or the shrinkage factor at the time of firing varies depending on the portions of the honeycomb fired body. For example, when the pillar-shaped honeycomb dried body passes through a continuous firing furnace in a state where it is placed on a shelf board so that the extending direction of the cells is parallel to the direction of gravity, the obtained pillar-shaped honeycomb fired body tends to have larger shrinkage amounts in the portion that has been located at a rear side in the travelling direction in the continuous firing furnace and the portion that has been facing the vicinity of 45° angle at a front side in the travelling direction. It is presumed that this is because a high-temperature gas flow tends to come into contact with these portions of the pillar-shaped honeycomb dried body when it passes through the furnace.

(Step G1: Generating Target Contour of the Pillar-Shaped Honeycomb Dried Body)

In the step G1, firing shrinkage based on the ratio or difference calculated for each angle in the step F1 is predicted for each angle, and a target contour for at least one of the first end surface and the second end surface of the pillar-shaped honeycomb dried body is generated such that the contour of at least one of the first end surface and second end surface of the pillar-shaped honeycomb fired body prepared from a next time onward is closer to the designed contour than the first pillar-shaped honeycomb fired body.

Based on the ratio or difference calculated for each angle in the step F1, it is possible to predict the firing shrinkage for each angle when firing under the same conditions. That is, if there is no difference in the firing conditions, the shrinkage factor is predicted to be substantially constant for each angle, so that the shrinkage factor for each angle in the firing next time onward can be predicted. For example, at a certain angle, assuming said distance R of the pillar-shaped honeycomb dried body is Rb, said distance R of the pillar-shaped honeycomb fired body is Ra, and the designed said distance R of the pillar-shaped honeycomb fired body is Rd, if a value (Rd×Rb/Ra) obtained by multiplying Rd by the shrinkage factor (=Rb/Ra) is defined as a target distance Rt at this angle in the pillar-shaped honeycomb dried body, the Ra at the time of the next firing can be brought closer to Rd, and desirably they can be the same. In this way, the target distance Rt in the pillar-shaped honeycomb dried body can be determined for all the angles at which the distance R is measured, and it is possible to generate a target contour on at least one of the first end surface and the second end surface of the pillar-shaped honeycomb dried body by smoothly connecting the tips on the outer peripheral side of the distance Rt obtained at the every predetermined angle.

(Step H1: Preparation of Modified Annular Mask)

In the step H1, an annular mask with a modified inner peripheral contour is prepared such that the contour of at least one of the first end surface and the second end surface of the pillar-shaped honeycomb dried body prepared from the next time onward is closer to the designed contour than the first pillar-shaped honeycomb dried body. The inner peripheral contour of the annular mask may substantially the same as the target contour, or may be slightly larger than the target contour in anticipation of shrinkage when the pillar-shaped honeycomb formed body is dried. Since the shrinkage during drying is smaller than the shrinkage during firing, it is not compulsory to take into consideration the drying shrinkage for each angle as when measuring the firing shrinkage, and it is sufficient to modify the inner peripheral contour of the annular mask using an average shrinkage factor at the time of drying. However, as with the firing shrinkage, the target contour of the inner peripheral contour of the annular mask also may be designed in consideration of the drying shrinkage for each angle.

Figure 9:
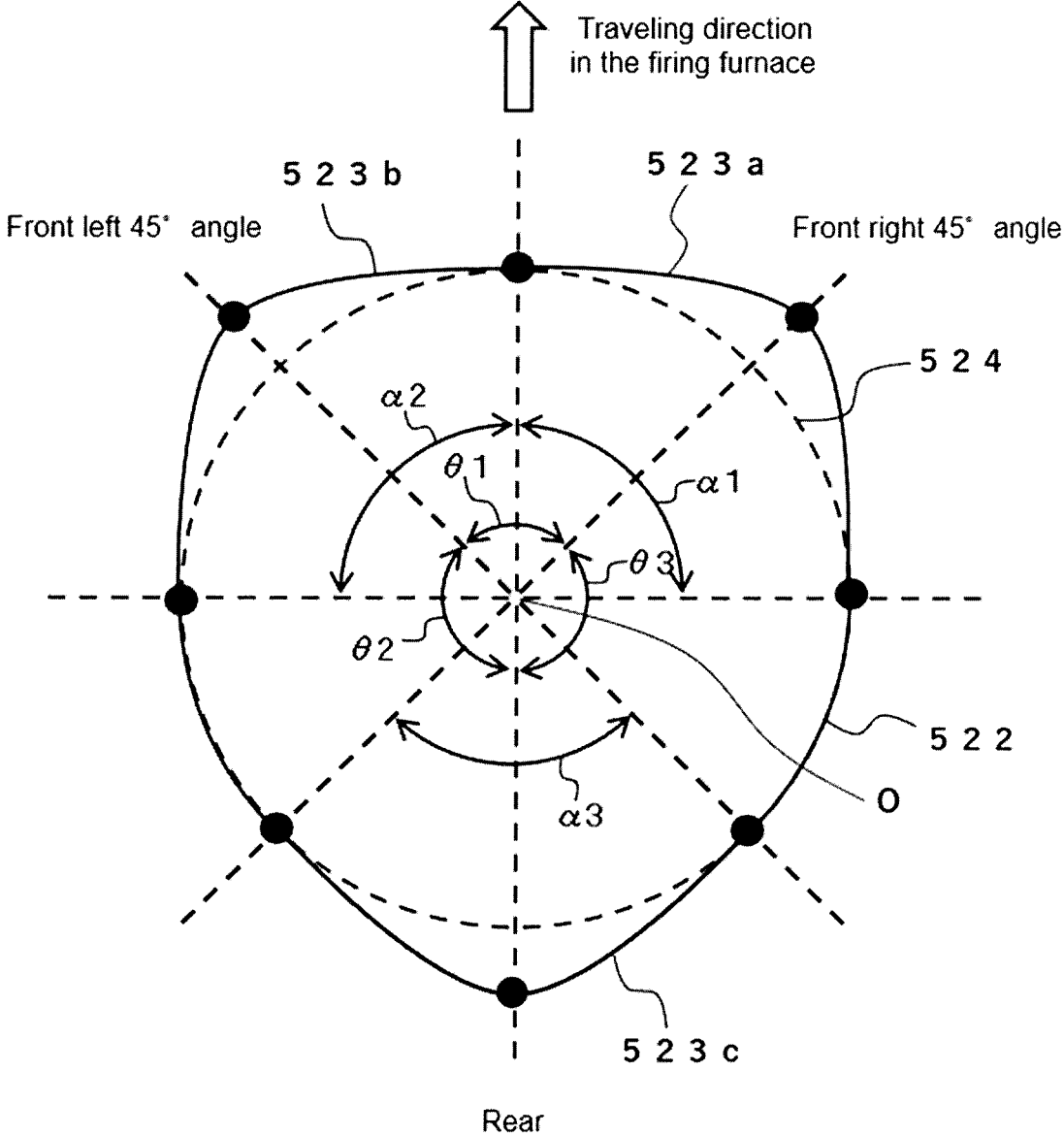
FIG. 9 schematically shows an example of an inner peripheral contour of a modified annular mask in the case of manufacturing a pillar-shaped honeycomb fired body in which the designed contour of the first end surface and the second end surface is a perfect circle.

FIG. 9 schematically shows an example of the inner peripheral contour 522 of the modified annular mask in the case of manufacturing a pillar-shaped honeycomb fired body in which the designed contour of the first end surface and the second end surface is a perfect circle. In FIG. 9, the solid line shows the modified inner peripheral contour 522 of the annular mask. The circle 524 shown by the dotted line is the maximum perfect circle inscribed in the inner contour. The perfect circle may be the inner peripheral contour of the annular mask before the modification.

The inner peripheral contour 522 of the modified annular mask shown in FIG. 9 has three curved portions that bulge outward with respect to the maximum perfect circle inscribed in the inner peripheral contour 522. Assuming each of the curved portions is referred to as a first curved portion 523a, a second curved portion 523b, and a third curved portion 523c in this order, and assuming the most outwardly bulging part of each of the curved portions is the center of each of the curved portions, in one embodiment, the central angle $\theta_1$ between the center of the first curved portion 523a and the center of the second curved portion 523b (referring to the angle formed by a line connecting the center of the first curved portion 523a and the center of gravity O of the perfect circle and a line connecting the center of the second curved portion 523b and the center of gravity O of the perfect circle. The same shall apply hereinafter.) is from 80° to 100°, a central angle $\theta_2$ between the center of the second curved portion 523b and the center of the third curved portion 523c is from 125° to 145°, and a central angle $\theta_3$ between the center of the third curved portion 523c and the center of the first curved portion 523a is from 125° to 145°. In a preferred embodiment, the central angle $\theta_1$ between the center of the first curved portion 523a and the center of the second curved portion 523b is from 85° and 95°, the central angle $\theta_2$ between the center of the second curved portion 523b and the center of the third curved portion 523c is from 130° and 140°, and the central angle $\theta_3$ between the center of the third curved portion 523c and the center of the first curved portion 523a is from 130° and 140°.

The central angle $\alpha1$ formed by two straight lines connecting both ends of the first curved portion 523a with the center of gravity O of the perfect circle can be, for example, 45° to 90°, preferably 80° to 90°. The central angle $\alpha2$ formed by two straight lines connecting both ends of the second curved portion 523b with the center of gravity O of the perfect circle can be 45° to 90°, preferably 80° to 90°. The central angle $\alpha3$ formed by two straight lines connecting both ends of the third curved portion 523c with the center of gravity O of the perfect circle can be 45° to 180°, preferably 80° to 100°.

As can be understood from the example of the inner peripheral contour 522 of the modified annular mask shown in FIG. 9, in one embodiment, the designed contour of the first end surface and the second end surface of the first pillar-shaped honeycomb fired body described above (the same as the designed contour of the first end surface and the second end surface of the second pillar-shaped honeycomb fired body described later.) is non-homothetic to the inner peripheral contour of the annular mask prepared by the step H1. This means that the shrinkage factor of firing shrinkage varies depending on the portions of the pillar-shaped honeycomb dried body. Such variation is likely to occur when the received heat history is different depending on the portions during firing, for example, when the pillar-shaped honeycomb dried body is fired while passing through a continuous firing furnace in a state where it is placed on a shelf board so that the extending direction of the cells is parallel to the direction of gravity or the like.

(Step A2: Preparation of the Second Pillar-Shaped Honeycomb Formed Body)

In the step A2, a second pillar-shaped honeycomb formed body is prepared by performing extrusion molding of a green body comprising a ceramic raw material, a pore-forming material, a binder and a dispersion medium, through a die that defines opening shapes of said plurality of cells, and the annular mask prepared by the step H1 that is disposed downstream of the die and has the inner peripheral contour for defining the contour of the first end surface and the second end surface.

Normally, it is intended that the second pillar-shaped honeycomb fired body prepared through the steps A2, B2 and D2 should have the same design specifications as the first pillar-shaped honeycomb fired body prepared through the step A1, step B1 and step D1 (that is, the same model number is given). Therefore, it is desirable that the step A2 be carried out under the same or substantially the same conditions as the step A1 (green body composition, molding conditions, and the like) except that the annular mask is different.

(Step B2: Drying of the Second Pillar-Shaped Honeycomb Formed Body)

Next, the step B2 of drying the second pillar-shaped honeycomb formed body is carried out to obtain a second pillar-shaped honeycomb dried body. The drying conditions of the step B2 may be the same as those of the step B1. The second pillar-shaped honeycomb formed body is formed through the modified annular mask prepared in the step H1. Therefore, the contour of at least one of the first end surface and the second end surface, preferably the contour of both the first end surface and the second end surface of the second pillar-shaped honeycomb dried body is closer to the target contour than that of the first pillar-shaped honeycomb dried body.

(Step D2: Firing of the Second Pillar-Shaped Honeycomb Dried Body)

In the step D2, the second pillar-shaped honeycomb dried body is fired to obtain a second pillar-shaped honeycomb fired body whose contour is corrected. The firing conditions of the step D2 may be the same as those of the step D1. When a degreasing step is carried out before the firing, the degreasing conditions may be the same as the degreasing conditions for the first pillar-shaped honeycomb dried body.

In the step D2, it is necessary to pay attention to the orientation of the second pillar-shaped honeycomb dried body at the time of firing. As described above, the shrinkage amount (or the shrinkage factor) generated by the firing varies depending on the portions of the pillar-shaped honeycomb dried body, for example, the front side portion, the rear side portion, the left side portion, and the right-side portion with respect to the traveling direction of the pillar-shaped honeycomb dried body in the furnace. Further, the annular mask is modified in consideration of the orientation. Therefore, it is necessary to fire the second pillar-shaped honeycomb dried body in a state where the orientation is adjusted such that the contour of at least one of the first end surface and the second end surface of the second pillar-shaped honeycomb fired body obtained by firing the second pillar-shaped honeycomb dried body is closer to the designed contour than that of the first pillar-shaped honeycomb fired body. Here, "closer to the designed contour than that of the first pillar-shaped honeycomb fired body" is judged by the following judgment method.

(1) With respect to the actually obtained first pillar-shaped honeycomb fired body and the second pillar-shaped honeycomb fired body, at least one of the first end surface and the second end surface is photographed with a camera, and an image of the end surface is generated. Based on the generated image, a set of points (3000 points per end surface) constituting the contour of the at least one of the first end surface and the second end surface is evenly plotted on two-dimensional coordinates, and the average value of the coordinate values (coordinates of the center of gravity) of the plotted points is obtained. Then, the actual distance from the coordinates of the center of gravity to each plotted point is calculated.

(2) An image of the end surface is generated based on the designed contour of the first pillar-shaped honeycomb fired body (second pillar-shaped honeycomb fired body). Based on the generated image, a set of points (3000 points per end surface) constituting the contour of the at least one of the first end surface and the second end surface is evenly plotted on two-dimensional coordinates, and the average value of the coordinate values (coordinates of the center of gravity) of the plotted points is obtained. Then, the designed distance from the coordinates of the center of gravity to each plotted point is calculated. At this time, when the contour of the first end surface and the second end surface is not a perfect circle, the points plotted in (2) should correspond to the points plotted in (1) in terms of positional relationship on the contour. When the distance from the coordinates of the center of gravity to each point on the design can be calculated, such as when the contour of the first end surface and the second end surface is a perfect circle, the distance may be calculated.

(3) For the at least one of the first end surface and the second end surface of the first pillar-shaped honeycomb fired body, the absolute value of the difference between the actual distance obtained in (1) and the designed distance obtained in (2) is obtained for each corresponding point. The absolute values of the difference for the obtained 3000 points are totaled, and the average value is used as an error before correction.

(4) For the at least one of the first end surface and the second end surface of the second pillar-shaped honeycomb fired body, the absolute value of the difference between the actual distance obtained in (1) and the designed distance obtained in (2) is obtained for each corresponding point. The absolute values of the difference for the obtained 3000 points are totaled, and the average value is used as an error after correction.

(5) When the error after correction is smaller than the error before correction, it is judged that the contour of the at least one of the first end surface and the second end surface of the second pillar-shaped honeycomb fired body obtained by firing the second pillar-shaped honeycomb dried body is closer to the designed contour than that of the first pillar-shaped honeycomb fired body.

For example, given that the shrinkage amount is larger in the portion located at the rear side in the traveling direction and in the portion facing the vicinity of 45° angle at the front side in the travelling direction in the continuous firing furnace, a case where the pillar-shaped honeycomb formed body is formed using an annular mask having a modified inner peripheral contour as shown in FIG. 9 is considered.

When the annular mask having the inner peripheral contour shown in FIG. 9 is used, the contour of the first end surface and the second end surface of the obtained pillar-shaped honeycomb formed body corresponds to the inner peripheral contour. Therefore, in FIG. 9, by adjusting the orientation of the pillar-shaped honeycomb dried body so that the pillar-shaped honeycomb dried body passes through the firing furnace in the orientation in accordance with "Rear", "Front right 45° angle", and "Front left 45° angle", a second pillar-shaped honeycomb fired body that has a contour closer to the designed contour (here, a perfect circle) than the first pillar-shaped honeycomb fired body can be obtained. Conversely, if the orientation of the pillar-shaped honeycomb dried body in the firing furnace is set so that the portion described as "rear" in FIG. 9 is located at the front side in the traveling direction in the firing furnace, a second pillar-shaped honeycomb fired body which is farther from the designed contour than the first pillar-shaped honeycomb fired body will be obtained.

EXAMPLES

The following Examples and Comparative Examples relate to a method for manufacturing a pillar-shaped honeycomb fired body having the following design specifications.

Overall shape: Cylindrical with a diameter of 158 mm and a height of 110 mm

Cell shape in cross section perpendicular to the cell flow path direction: Square Cell density (number of cells per unit cross-sectional area): 600 cells/cm$^2$ Partition wall thickness: 50 μm Porosity: Approximately 30%

Example 1

(1. Preparation of a First Pillar-Shaped Honeycomb Fired Body)

To 100 parts by mass of the cordierite-forming raw material, 1 part by mass of a pore-forming material, 30 parts by mass of a dispersion medium, 8 parts by mass of an organic binder, and 1 part by mass of a dispersant were added, and they were mixed and kneaded to prepare a green body. Alumina, aluminum hydroxide, kaolin, talc, and silica were used as the cordierite-forming raw material. Water was used as the dispersion medium, a water-absorbing resin was used as the pore-forming material, hydroxypropyl methyl-cellulose was used as the organic binder, and ethylene glycol was used as the dispersant.

The green body was put into an extrusion molding device to perform extrusion molding through a die that defines predetermined opening shapes of cells, and an annular mask that is disposed downstream of the die and has an inner peripheral contour (with a perfect circle shape of diameter=175.0 mm) for defining outer peripheral contour of the first end surface and the second end surface to obtain a first pillar-shaped honeycomb formed body (step A1). The direction of extrusion molding was horizontal. After the obtained first pillar-shaped honeycomb formed body was subject to dielectric-drying and hot-gas drying, both end surfaces were cut to have predetermined dimensions to obtain a first pillar-shaped honeycomb dried body (step B1).

For one of end surfaces of the first pillar-shaped honeycomb dried body (herein the first end surface), the distance R from the portion located at the center O of the die when the green body passed through the die to the outer peripheral side surface was measured every 0.12° for one round with a specific outer peripheral point set as 0° (step C1). The portion located at the center O of the die on the first end surface of the first pillar-shaped honeycomb dried body was specified by specifying the cell located at the center of gravity of the die based on the array of cells defined by the slit on the outlet face of the die, and based on the positional relationship between the cell and the center of gravity of the die.

Next, the first pillar-shaped honeycomb dried body was placed on a shelf board so that the extending direction of the cell was parallel to the direction of gravity, and the shelf board was placed on a trolley and passed through a degreasing region and a firing region in a continuous firing furnace. Degreasing and firing were performed under the following conditions to obtain a first pillar-shaped honeycomb fired body (step D1).

[Degreasing Conditions]

Maintained temperature in the degreasing region: 200° C.

Maintained time at the maintained temperature: 180 minutes

Direction of gas flow in the furnace: Headwind relative to the workpiece

Burner positions: Upper sides and lower sides in the furnace

[Firing Conditions]

Maintained temperature of the firing region: 1430° C.

Maintained time at the maintained temperature: 240 minutes

Direction of gas flow in the furnace: Headwind relative to the workpiece in the temperature rising region and in the first half of the temperature maintaining region, which have the greatest effect on firing shrinkage Burner positions: Upper sides and lower sides in the furnace For the first end surface of the first pillar-shaped honeycomb fired body, the actual distance R from the portion located at the center O of the die when the green body passed through the die to the outer peripheral side surface was measured every 0.12° for one round with the specific outer peripheral point set as 0° (step E1).

Next, the ratio (shrinkage factor) of the distance R of the first pillar-shaped honeycomb dried body measured in the step C1 to the distance R of the first pillar-shaped honeycomb fired body measured in the step E1 was calculated for each corresponding angle (step F1). Based on the shrinkage factor for each angle, a target contour on the first end surface of a second pillar-shaped honeycomb dried body was generated such that the contour of the first end surface of the second pillar-shaped honeycomb fired body to be prepared next time was closer to the designed contour than that of the first pillar-shaped honeycomb fired body. Specifically, at each angle, assuming the distance R of the first pillar-shaped honeycomb dried body was Rb, the distance R of the first pillar-shaped honeycomb fired body was Ra, and the designed distance R of the pillar-shaped honeycomb fired body was Rd, the value (Rd×Rb/Ra) obtained by multiplying Rd by the shrinkage factor (=Rb/Ra) was defined as the target distance Rt at each angle in the pillar-shaped honeycomb dried body. Then, a target contour on the first end surface of the second pillar-shaped honeycomb dried body was generated by smoothly connecting the tips on the outer peripheral side of the distance Rt obtained for each angle.

Next, based on the target contour on the first end surface of the second pillar-shaped honeycomb dried body obtained in the step F1, an annular mask having a modified inner peripheral contour was prepared (step H1). Specifically, the inner peripheral contour of the annular mask was modified by multiplying the target contour by the average shrinkage factor upon drying. As a result, as shown in FIG. 9, the inner peripheral contour of the modified annular mask possesses three curved portions that bulge outward with respect to the maximum perfect circle inscribed in the inner peripheral contour, and assuming each of the curved portions was referred to as the first curved portion 523*a*, the second curved portion 523*b*, and the third curved portion 523*c* in this order, and assuming the most outwardly bulging part of each curved portion was the center of each curved portion, the central angle $\theta_1$ between the center of the first curved portion 523*a* and the center of the second curved portion 523*b* was 90°, the central angle $\theta_2$ between the center of the second curved portion 523*b* and the center of the third curved portion 523*c* was 135°, and the central angle $\theta_3$ between the center of the third curved portion 523*c* and the center of the first curved portion 523*a* was 135°. Further, the central angle α1 formed by two straight lines connecting both ends of the first curved portion 523*a* with the center O of the maximum perfect circle was 90°, the central angle α2 formed by two straight lines connecting both ends of the second curved portion 523*b* with the center O of the maximum perfect circle was 90°, and the central angle α3 formed by two straight lines connecting both ends of the third curved portion 523*c* with the center O of the maximum perfect circle was 90°.

(2. Preparation of a Second Pillar-Shaped Honeycomb Fired Body)

A second pillar-shaped honeycomb formed body was prepared under the same conditions as in the step A1 except that the annular mask modified above was used (step A2). The contour of the first end surface of the obtained second pillar-shaped honeycomb formed body corresponded to the inner peripheral contour of the modified annular mask. Next, the second pillar-shaped honeycomb formed body was dried under the same conditions as in the step B1 to obtain a second pillar-shaped honeycomb dried body (step B2). Finally, the second pillar-shaped honeycomb dried body was degreased and fired under the same conditions as in the step D1 to obtain a second pillar-shaped honeycomb fired body. At the time of firing, the orientation of the second pillar-shaped honeycomb dried body was adjusted so that the second pillar-shaped honeycomb dried body passed through the firing furnace in the orientation in accordance with "Rear", "Front right 45° angle", and "Front left 45° angle" as described in FIG. 9.

(3. Evaluation of Dimensional Accuracy)

The dimensional accuracy of the contour of the first end surface of the first pillar-shaped honeycomb fired body and the second pillar-shaped honeycomb fired body was evaluated. When the error before correction and the error after correction were calculated by the procedure described above, the error before correction was 0.176 mm and the error after correction was 0.126 mm. From this result, it can be said that the second pillar-shaped honeycomb fired body had significantly improved dimensional accuracy as compared with the first pillar-shaped honeycomb fired body.

Comparative Example 1

Step A1, step B1, step C1, step D1, step E1 and step F1 were carried out in the same manner as in Example 1. After that, the average value of the shrinkage factor for each angle obtained in the step F1 was calculated, and the value obtained by multiplying Rd by the average shrinkage factor was used as the target distance Rt in the second pillar-shaped honeycomb dried body to generate a perfect circular target contour on the first end surface of the second pillar-shaped honeycomb dried body. Then, an annular mask having a modified inner peripheral contour was prepared by the same procedure as in Example 1.

A second pillar-shaped honeycomb formed body was prepared under the same conditions as in the step A1 except that the annular mask modified above was used (step A2). Next, the second pillar-shaped honeycomb formed body was dried under the same conditions as in the step B1 to obtain a second pillar-shaped honeycomb dried body (step B2). Finally, degreasing and firing were performed under the same conditions as in the step D1 to obtain a second pillar-shaped honeycomb fired body. The orientation of the second pillar-shaped honeycomb dried body when passing through the firing furnace was not taken into consideration.

The dimensional accuracy of the contour of the first end surface of the second pillar-shaped honeycomb fired body was evaluated by the same method as in Example 1. As a result, the error after correction was 0.213 mm.

Comparative Example 2

Step A1 and Step B1 were carried out in the same manner as in Example 1 to obtain a first pillar-shaped honeycomb dried body. For one of end surfaces of the first pillar-shaped honeycomb dried body (herein the first end surface), the distance R from the position of the center of gravity to the outer peripheral side surface was measured every 0.12° for one round with a specific outer peripheral point set as 0°. The position of the center of gravity of the first end surface of the first pillar-shaped honeycomb dried body was specified by taking a picture of the first end surface with a camera and plotting a set of points (3000 points) constituting the contour of the first end surface evenly on the image in two-dimensional coordinates, and then calculating the average of the coordinate values of the plotted points. Note that the position of the center of gravity was different from the portion that was located at the center of the die.

Then, a first pillar-shaped honeycomb fired body was obtained by the same method as in Example 1. For the first end surface of the first pillar-shaped honeycomb fired body, the distance R from the position of the center of gravity to the outer peripheral side surface was measured every 0.12° for one round with said specific outer peripheral point set as 0°. The position of the center of gravity of the first end surface of the first pillar-shaped honeycomb fired body was specified by taking a picture of the first end surface with a camera and plotting a set of points (3000 points) constituting the contour of the first end surface evenly on the image in two-dimensional coordinates, and then calculating the average of the coordinate values of the plotted points. Note that the position of the center of gravity was different from the location that was located at the center of the die.

Next, the ratio (shrinkage factor) of the distance R of the first pillar-shaped honeycomb dried body measured in the above step to the distance R of the first pillar-shaped honeycomb fired body measured in the above step was calculated for each corresponding angle. Based on the shrinkage factor for each angle, a target contour on the first end surface of a second pillar-shaped honeycomb dried body was generated by the same method as in Example 1 such that the contour of the first end surface of the second pillar-shaped honeycomb fired body to be prepared next time was closer to the designed contour than that of the first pillar-shaped honeycomb fired body. Then, an annular mask having a modified inner peripheral contour was prepared by the same procedure as in Example 1.

A second pillar-shaped honeycomb formed body was prepared under the same conditions as in the step A1 except that the annular mask modified above was used. Next, the second pillar-shaped honeycomb formed body was dried under the same conditions as in the step B1 to obtain a second pillar-shaped honeycomb dried body. Finally, the second pillar-shaped honeycomb dried body was degreased and fired under the same conditions as in the step D1 to obtain a second pillar-shaped honeycomb fired body. At this time, firing was performed in a state where the orientation of the pillar-shaped honeycomb dried body was adjusted such that the contour of the first end surface of the second pillar-shaped honeycomb fired body obtained by firing the second pillar-shaped honeycomb dried body was closer to the designed contour than that of the first pillar-shaped honeycomb fired body.

The dimensional accuracy of the contour of the first end surface of the second pillar-shaped honeycomb fired body was evaluated by the same method as in Example 1. As a result, the error after correction was 0.234 mm.

DISCUSSION

In Example 1, it can be seen that the second pillar-shaped honeycomb fired body was closer to the designed contour than the first pillar-shaped honeycomb fired body as compared with Comparative Example 1 and Comparative Example 2. Therefore, by implementing the method for manufacturing a pillar-shaped honeycomb fired body according to Example 1, it becomes possible to manufacture a pillar-shaped honeycomb fired body having excellent dimensional accuracy.

DESCRIPTION OF REFERENCE NUMERALS

100 Pillar-shaped honeycomb fired body
102 Outer peripheral side surface
103 Outer peripheral side wall
104 First end surface
106 Second end surface
108 Cell
112 Partition wall
200 Pillar-shaped honeycomb fired body
202 Outer peripheral side surface
203 Outer peripheral side wall
204 First end surface
206 Second end surface
212 Partition wall
208a First cell
208b Second cell
209 Plugged portion
500 Extrusion molding device
510 Die
511 Inner portion
511a Slit
512 Outer peripheral portion
512a Slit
513 Step portion
514 Outlet face
520 Annular mask
522 Inner peripheral contour
523a First curved portion
523b Second curved portion
523c Third curved portion
524 Circle 530 Gap portion
540 Holding jig
550 Back holding plate
560 Pillar-shaped honeycomb formed body

The invention claimed is:

1. A method for manufacturing a pillar-shaped honeycomb fired body having an outer peripheral side surface and partition walls that are disposed on an inner peripheral side of the outer peripheral side surface and partition a plurality of cells each forming a flow path from a first end surface to a second end surface, the method comprising:

a step A1 of preparing a first pillar-shaped honeycomb formed body by performing extrusion molding of a green body comprising a ceramic raw material, a pore-forming material, a binder and a dispersion medium, through a die that defines opening shapes of the plurality of cells, and an annular mask that is disposed downstream of the die and has an inner peripheral contour for defining an outer peripheral contour of the first end surface and the second end surface;

a step B1 of drying the first pillar-shaped honeycomb formed body to obtain a first pillar-shaped honeycomb dried body;

a step C1 of measuring an actual distance from a portion that has been located at a center of the die when the green body passes through the die to the outer peripheral side surface at every predetermined angle for one round in at least one of the first end surface and the second end surface of the first pillar-shaped honeycomb dried body;

a step D1 of firing the first pillar-shaped honeycomb dried body to obtain a first pillar-shaped honeycomb fired body;

a step E1 of measuring an actual distance from the portion that has been located at the center of the die when the green body passes through the die to the outer peripheral side surface at every predetermined angle for one round in at least one of the first end surface and the second end surface of the first pillar-shaped honeycomb fired body;

a step F1 of calculating a ratio or difference for the every predetermined angle between the actual distance from the portion to the outer peripheral side surface of the first pillar-shaped honeycomb dried body obtained in the step C1 and the actual distance from the portion to the outer peripheral side surface of the first pillar-shaped honeycomb fired body obtained in the step E1;

a step G1 of predicting a firing shrinkage for the every predetermined angle based on the ratio or the difference calculated for the every predetermined angle in the step F1, and generating a target contour for at least one of the first end surface and the second end surface of the pillar-shaped honeycomb dried body such that a contour of at least one of the first end surface and the second end surface of the pillar-shaped honeycomb fired body prepared from a next time onward is closer to a designed contour than the first pillar-shaped honeycomb fired body;

a step H1 of preparing an annular mask with a modified inner peripheral contour such that the contour of at least one of the first end surface and the second end surface of a pillar-shaped honeycomb dried body prepared from the next time onward is closer to the target contour than the first pillar-shaped honeycomb dried body;

a step A2 of preparing a second pillar-shaped honeycomb formed body by performing extrusion molding of a green body comprising a ceramic raw material, a pore-forming material, a binder and a dispersion medium, through a die that defines opening shapes of the plurality of cells, and the annular mask prepared by the step H1 that is disposed downstream of the die and has the modified inner peripheral contour for defining the contour of the first end surface and the second end surface;

a step B2 of drying the second pillar-shaped honeycomb formed body to obtain a second pillar-shaped honeycomb dried body whose contour of at least one of the first end surface and the second end surface is closer to the target contour than the first pillar-shaped honeycomb dried body; and a step D2 of firing the second pillar-shaped honeycomb dried body in a state where its orientation is adjusted such that the contour of at least one of the first end surface and the second end surface of a second pillar-shaped honeycomb fired body obtained by firing the second pillar-shaped honeycomb dried body is closer to the designed contour than that of the first pillar-shaped honeycomb fired body, whereby to obtain the second pillar-shaped honeycomb fired body whose contour is corrected.

2. The method according to claim 1, wherein the step D1 and the step D2 comprise performing the firing while the first and the second pillar-shaped honeycomb dried bodies pass through a continuous firing furnace in a state where they are placed on a shelf board so that the extending direction of the plurality of cells is parallel to a direction of gravity.

3. The method according to claim 1, wherein in the step A1 and the step A2, a direction of the extrusion molding is horizontal.

4. The method according to claim 1, wherein the designed contour of the first end surface and the second end surface of the first and the second pillar-shaped honeycomb fired bodies are non-homothetic shapes to the inner peripheral contour of the annular mask prepared by the step H1.

5. The method according to claim 1, wherein in the step A1 and the step A2, a direction of the extrusion molding is horizontal;

the step D1 and the step D2 comprise performing the firing while the first and the second pillar-shaped honeycomb dried bodies pass through a continuous firing furnace in a state where they are placed on a shelf board so that the extending direction of the plurality of cells is parallel to a direction of gravity;

the designed contour of the first and the second end surfaces of the first and the second pillar-shaped honeycomb fired bodies are perfect circles;

the inner peripheral contour of the annular mask prepared by the step H1 comprises three curved portions that bulge outward with respect to a maximum perfect circle inscribed in the inner peripheral contour, and assuming each of the curved portions is referred to as a first curved portion, a second curved portion, and a third curved portion in this order, and assuming a most outwardly bulging part of each of the curved portions is a center of each of the curved portions, a central angle $\theta 1$ between the center of the first curved portion and the center of the second curved portion is from 80° to 100°, a central angle $\theta 2$ between the center of the second curved portion and the center of the third curved portion is from 125° to 145°, and a central angle $\theta 3$ between the center of the third curved portion and the center of the first curved portion is from 125° to 145°; and the step D2 comprises adjusting the orientation of the second pillar-shaped honeycomb dried body placed on the shelf board such that a portion of the second pillar-shaped honeycomb dried body corresponding to the center of the third curved portion is located at a rear side in a traveling direction in the continuous firing furnace.

6. The method according to claim 1, wherein the every predetermined angle in the step C1 and the step E1 is 60° or less.

* * * * *